US009476171B2

(12) United States Patent
Georgakis et al.

(10) Patent No.: US 9,476,171 B2
(45) Date of Patent: Oct. 25, 2016

(54) CONSTRUCTION AND A TENSION ELEMENT COMPRISING A CABLE AND ONE OR MORE STRAKES

(71) Applicant: Danmarks Tekniske Universitet, Lyngby (DK)

(72) Inventors: Christos Thomas Georgakis, Holte (DK); Kenneth Kleissl, Copenhagen (DK)

(73) Assignee: Danmarks Tekniske Universitet, Lyngby (DK)

( * ) Notice: Subject to any disclaimer, the term of this patent is extended or adjusted under 35 U.S.C. 154(b) by 0 days.

(21) Appl. No.: 14/409,779

(22) PCT Filed: Jun. 28, 2013

(86) PCT No.: PCT/EP2013/063654
§ 371 (c)(1),
(2) Date: Dec. 19, 2014

(87) PCT Pub. No.: WO2014/001514
PCT Pub. Date: Jan. 3, 2014

(65) Prior Publication Data
US 2015/0152610 A1 Jun. 4, 2015

(30) Foreign Application Priority Data
Jun. 28, 2012 (EP) .................................... 12174089

(51) Int. Cl.
*E01D 11/00* (2006.01)
*E01D 19/16* (2006.01)
(Continued)

(52) U.S. Cl.
CPC ............... *E01D 19/16* (2013.01); *E01D 11/00* (2013.01); *E01D 11/02* (2013.01); *E01D 11/04* (2013.01); *F15D 1/10* (2013.01)

(58) Field of Classification Search
CPC ....... E01D 11/00; E01D 11/02; E01D 11/04; E01D 19/16; F15D 1/004; F15D 1/10; F15D 1/12
USPC ........................................................ 14/18–23
See application file for complete search history.

(56) References Cited

U.S. PATENT DOCUMENTS 4,059,129 A 11/1977 Feis
4,180,369 A 12/1979 Ottosen
(Continued)

FOREIGN PATENT DOCUMENTS

CN 2379540 Y 5/2000
CN 102345272 A 2/2012
(Continued)

OTHER PUBLICATIONS

International Search Report and Written Opinion from International Application No. PCT/EP2013/063654 dated Oct. 22, 2013.
(Continued)

*Primary Examiner* — Raymond W Addie
(74) *Attorney, Agent, or Firm* — Alston & Bird LLP

(57) ABSTRACT

The invention provides a construction comprising a structural element and at least one cable (101) arranged in tension to carry at least a part of the weight of the structural element. The cable defines an outer surface (102) onto which at least one strake (104) forms a protrusion for reducing rain and wind induced vibrations. The strake has a height being a distance from a strake root part connected to the outer surface of the cable and a strake end part terminating the strake outwards away from the cable, and the strake has a width being transverse to the height, the width decreasing in the direction from the strake root part towards the strake end part. The height is less than 5 percent of the diameter of the cable. Furthermore, the strake comprises a first strake surface portion facing away from the cable, which first strake surface portion is concave or straight.

10 Claims, 3 Drawing Sheets

(51) Int. Cl.
*E01D 11/02* (2006.01)
*E01D 11/04* (2006.01)
*F15D 1/10* (2006.01)

(56) References Cited

U.S. PATENT DOCUMENTS

| | | | | |
|---|---|---|---|---|
| 2007/0056384 A1* | 3/2007 | Yung | G01M 10/00 | 73/807 |
| 2007/0125546 A1* | 6/2007 | Allen | B63B 21/00 | 166/367 |
| 2007/0196181 A1* | 8/2007 | Tyrer | B63B 21/502 | 248/49 |
| 2008/0131210 A1* | 6/2008 | Wajnikonis | B63B 21/502 | 405/211 |
| 2008/0236469 A1* | 10/2008 | Masters | F15D 1/10 | 114/243 |
| 2010/0129159 A1* | 5/2010 | Brown | E21B 17/01 | 405/211 |
| 2012/0291687 A1* | 11/2012 | Dehne | F16L 1/123 | 114/271 |

FOREIGN PATENT DOCUMENTS

| | | |
|---|---|---|
| GB | 2 335 248 A | 9/1999 |
| WO | WO 94/02744 A1 | 2/1994 |
| WO | WO 00/61433 A1 | 10/2000 |

OTHER PUBLICATIONS

International Preliminary Report on Patentability (Chapter II) from International Application No. PCT/EP2013/063654 dated Dec. 5, 2014.

Search Report for corresponding Chinese Application No. 2013800348719 dated Oct. 22, 2015, 2 pages.

* cited by examiner

CONSTRUCTION AND A TENSION ELEMENT COMPRISING A CABLE AND ONE OR MORE STRAKES

CROSS-REFERENCE TO RELATED APPLICATIONS

This application is a national phase entry of International Appl. No. PCT/EP2013/063654, filed on Jun. 28, 2013, which claims priority to European Appl. No. EP 12174089.8, filed on Jun. 28, 2012, the contents of each of which are incorporated herein in their entirety.

FIELD OF THE INVENTION

The present invention relates to a construction comprising a structural element and at least one cable arranged in tension to carry at least a part of the weight of the structural element. The cable defines an outer surface onto which at least one strake forms a protrusion for reducing rain and wind induced vibrations.

BACKGROUND OF THE INVENTION

Cables supporting or suspending structures such as antennas and bridges often vibrate due to wind and rain. In the case of cables for bridges, the traffic passing the bridge also contributes to the vibrations however 95 percent of the vibrations are caused by wind and rain. These vibrations are undesirable as they may result in damage on the cables and fatigue.

It is known to try to reduce these vibrations by introducing viscous or frictional dampers to bridge cables and stays. However, such means do not prevent rain-wind induced rivulets. Such rivulets change the aerodynamic profile of the cable which causes the cable to vibrate.

DESCRIPTION OF THE INVENTION

It is an object of embodiments of the present invention to provide an improved construction, an improved tension element, and an improved method for reducing rain and wind induced vibrations.

It is a further object of embodiments of the present invention to reduce or even prevent formation of water rivulets on a cable.

It is an even further object of embodiments of the present invention to reduce rain and wind induced vibrations without increasing the drag force.

According to a first aspect, the invention provides a construction comprising a structural element and at least one cable arranged in tension to carry at least a part of the weight of the structural element, the cable defining an outer surface onto which at least one strake forms a protrusion for reducing rain and wind induced vibrations, wherein the strake has a height being a distance from a strake root part connected to the outer surface of the cable and a strake end part terminating the strake outwards away from the cable, the strake having a width being transverse to the height, the width decreasing in the direction from the strake root part towards the strake end part, wherein the height is less than 5 percent of the diameter of the cable, and wherein the strake comprises a first strake surface portion facing away from the cable, the first strake surface portion being concave or straight.

By designing the strake such that the height is less than 5 percent of the diameter of the cable, and such that the strake comprises a first strake surface portion facing away from the cable, where the first strake surface portion is concave or straight, the strake has a shape which when air (the wind) flows along the outer surface of the cable, reduces any water present on this outer surface of the cable as it will be deflected from the surface by ramping of the rain due to the first strake surface being straight or concave. The effect is that the formation of rain rivulets on the cable is prevented. This improves the aerodynamic properties of the cable, whereby rain and wind induced vibrations are minimized or even prevented without increasing the drag force acting on the cable compared to traditional cables.

The concave or straight surface portion may be defined on any part of the strake. However, it will be appreciated that by arranging the concave surface correctly, it may serve as a ramp along which water may flow and from which the water may be ejected by the wind. Accordingly, in one embodiment, the at least one concave surface is arranged to cause wind to deflect water from the outer surface of the cable.

In order to achieve the latter, the concave or straight surface portion is arranged so that it faces away from the cable, such that the wind may move the water along the outer surface of the cable and further onto the concave or straight surface portion. In one particular embodiment, the concave or straight surface portion in at least one point (e.g. the centre point) defines a tangent which coincides with a tangent of the outer surface of the cable. Furthermore, the concave surface portion may define a tangent at the strake root being smaller than or equal to a tangent at the strake end.

The cable may be adapted for outdoor use where it is subjected to wind and rain. The cable may be suitable for supporting a mast and/or for suspending a structure such as a bridge or a platform. As an example, the cable may be used in connection with cable stayed bridges.

Moreover, the cable according to the present invention may be a main cable or a suspender cable of a suspension bridge. Moreover, the cable may be an inclined cable e.g. for a cable stayed bridge.

In the context of the present invention, the terms 'cable' and 'stay' shall be seen as synonyms unless otherwise described.

The cable may be formed by a solid material such as a cylindrical solid wire. Moreover, the cable may comprise a plurality of strands which may be braided or twisted relative to each other. As an example, the cable may be a wire rope comprising strands which are twisted into a helix. The number of strands may be one or a plurality such as two, three, four, five, six, seven, eight, nine, ten or 15 or 20. In case of a plurality of strands, the strands may extend parallel to each other or the strands may be twisted or braided.

The outer surface of the cable may be untreated/raw or smooth. A sheath may be provided around the strands e.g. so as to create the smooth outer surface. By smooth shall be understood that the surface is smooth in areas where the strakes are not formed. The sheath may serve as a corrosion protection of the cable. In one embodiment, the sheath creates a non-smooth outer surface e.g. into which a plurality of indentations are provided, The non-smooth outer surface of the sheath may be untreated/raw or purposely manufactured so as to provide this non-smooth outer surface.

The at least one strake extends radially away from the cable (relative to the geometrical centre of the cable) so as to form a protrusion or projection or ridge. Longitudinally, the strake may extend along the outer surface of the cable.

The at least one strake may form a separate element which is secured or fastened to the outer surface of the cable. The strake may be secured/attached to the outer surface of the cable by means of an adhesive. Alternatively, or as a supplement, a fastening element may be provided for securing the stake to the outer surface. One example of such a fastening element is a clamp or a plurality of clamps.

In one embodiment, the at least one strake is attached to the cable such that it may be detached and re-attached to the cable.

In one embodiment, the at least one strake is permanently secured to the cable. By permanently secured shall be understood that the strake cannot be removed from the cable without permanently damaging the strake and/or the cable. In one example, the at least one strake is secured to the cable by means of welding e.g. by means of ultrasound welding.

In one embodiment, the at least one strake forms an integral part of the cable or a sheath formed around the cable. By 'form an integral part' shall be understood that the strake and the cable/sheath form one unitary element, e.g. by forming them in one piece. In one embodiment, the at least one strake and the cable/sheath form a monolithic element. The term 'monolithic element' shall in the context of the present invention be understood such that no seams (e.g. welding seams) may be defined between the cable and the strake.

Thus, it should be understood, that the term "connected to the outer surface" covers both that the at least one strake is a separate element being attached to the outer surface of the cable and that the at least one strake in another embodiment is formed in one piece with the cable.

In the context of the present invention, the term 'strake root part' shall designate that part of the strake which is closest to the outer surface of the cable. In embodiments wherein the at least one strake forms a separate element which is secured to the outer surface of the cable, the strake root part contacts the outer surface of the cable. In embodiments where the strake and the cable/sheath forms an integral product or define a monolithic element, the strake root part shall be defined by a transition between the cable and the strake.

The 'strake end part' on the contrary defines the free end of the strake, i.e. the end terminating the strake outwards away from the cable.

In the context of the present invention, the term 'height' when used in relation to the strake shall designate that dimension of the strake which extends in a direction parallel to the radius of the cable onto which it is connected, i.e. the distance between the strake end part and the strake root part in a direction perpendicular to the outer surface of the cable. This height is less than 5 percent of the diameter of the cable.

In the context of the present invention, the term 'width' when used in relation to the strake shall designate that dimension of the strake which extends transverse to the height of the strake. The width is decreasing in the direction from the strake root part towards the strake end part.

In the context of the present invention, the term 'length' when used in relation to the strake shall designate the longest dimension of the strake, the length being transverse to both the height and the width. The at least one stake is connected to the cable along the length of the strake.

The strake and/or the cable may comprise a metal material such as steel, copper, stainless steel, aluminium, zinc. Moreover, the strake and/or the cable may comprise plastic material such as PVC, PE, HDPE; and/or a rubber material such as natural or synthetic rubber; and/or a composite material e.g. comprising glass fibres, carbon fibres, vectran.

The height of the at least one strake is less than 5 percent of the diameter of the cable, such as less than 4 percent, such as less than 3 percent, such as less than 2 percent, such as less than 1 percent, such as less than 0.5 percent, such as less than 0.4 percent, such less than 0.3 percent, such less than 0.2 percent, such as less than 0.1 percent.

The height of the strake may be below 10 mm, such as below 9 mm, such as below 8 mm, such as below 7 mm, such as below 6 mm, such as below 5 mm, such as below 4 mm, such as below 3 mm, such as below 2 mm, such as below 1 mm.

The widest part of the strake may constitute 0.1-5 percent of the circumference of the cable, such as 0.1 percent, such as 0.5 percent, such as 1 percent, such as 2 percent, such as 3 percent, such as 4 percent, such as 5 percent.

The widest part of the strake may be in the range of 0.1-25 mm, such as 1 mm, such as 2.5 mm, such as 5 mm, such as 7.5 mm, such as 10 mm, such as 12.5 mm, such as 15 mm, such as 17.5 mm, such as 20 mm, such as 22.5 mm, such as 25 mm.

The diameter of the cable may be 50-350 mm, such as above 50 mm, such as above 100 mm, such as above 150 mm, such as above 200 mm, such as above 250 mm, such as above 300 mm, such as above 350 mm.

To enable ramping of water rivulets from the cable, the first strake surface portion may extend from the strake root part to the strake end part, thereby providing a ramp for rivulets flowing along the outer surface of the cable.

In one embodiment, a cross-sectional shape of the strake defines a triangle or a trapezoid. In the case of the triangle, two sides of the triangle may face away from the cable while the third side of the triangle contacts the outer surface of the cable. Accordingly, in the latter example, the strake defines a tapered part which terminates in a tip extending away from the cable, i.e. at the strake end part. One of the sides facing away from the cable is the first strake surface being concave or straight.

In one embodiment, the at least one strake comprises two concave surfaces. The two surfaces may be identically shaped and of identical size. Alternatively, the concave shapes and/or size may be different. The two concave surfaces of the at least one strake may face away from each other.

In some embodiments it is desirable that the tip is as sharp as possible. However, it will be appreciated that no matter how sharp the tip is, it will always define a radius—although this radius decreases the sharper the tip is. In one embodiment, the radius of the tip is below 1 mm, such as below 0.8 mm, such as below 0.6 mm.

As an alternative to being sharp, the tip of the strake may be flat or define a concavity. It will be appreciated that in the latter cases the general shape of the strake may be trapezoid.

In the context of the present invention, the two side surfaces of the triangle which extends away from the outer surface of the cable shall be designated 'the radial side surfaces', although these sides do not necessarily define a normal to the outer surface of the cable. The point/transition where the radial side surfaces meet the outer surface of the cable shall in the context of the present invention be designated 'the contact point' of the respective radial side surface and the outer surface of the cable. Moreover that side of the triangle which contacts the outer surface of the cable shall in the context of the present invention be designated 'the contact surface' of the triangle.

In cases where the at least one strake defines a trapezoid, the trapezoid may be defined by the abovementioned 'contact surface' and two of the abovementioned 'radial side surfaces'. The strake end part may be defined between the two radial side surfaces. This surface may be flat or concave.

In one embodiment, each of the two radial side surfaces (of the triangle and/or the trapezoid) extends in a direction transverse to a normal of the outer surface (of the cable) which extends through the contact point of the respective radial side surface.

In another embodiment, a first of the two radial side surfaces (of the triangle and/or the trapezoid) coincide with a normal of the outer surface (of the cable) which extends through the contact point of the respective first radial side surface, while the second of the two radial side surfaces does not coincide with a normal of the outer surface (of the cable) which extends through the contact point of the respective second radial side surface.

A smooth transition between the outer surface of the cable and the concave or straight surface portion may be achieved by providing the first surface portion such that the tangent hereto coincides with a tangent to the outer surface of the cable. It will be appreciated that the smoother the transition between the concave or straight surface and the cable is, the more effective will the ejection/discharge of the water be, as the momentum of the water droplets created by the wind and gravity will not be decreased significantly when the water droplets move from the outer surface to the concave or straight surface.

Despite of this, the present invention comprises embodiments wherein the strake comprises a concave surface portion which defines one or more concave surfaces and a transition part which interconnects the concave surface portion of the strake and the outer surface of the cable. In other words, the transition part may be closer to the strake root part than the concave surface. In some embodiments, the strake root part may define the transition part. Similarly, the concave surface may be closer to the strake end part than the strake root part. In some embodiments, the strake end part is defined by the concave surface.

Moreover it will be appreciated that each of the radial side surfaces may be defined by a transition surface of the transition part and a surface of the concave or straight surface portion. The latter surface may or may not be concave.

It will be appreciated that when the water droplets flow along the outer surface of the cable they will initially meet this transition surface. Thus, the angle of this transition surface relative to the contact point thereof determines how much the water droplet is halted when they flow along the outer surface of the cable and reaches the transition surface. In embodiments wherein the transition surface extends in a direction transverse to the normal of the outer surface at the contact point, the contact surface may guide the water droplets onto the concave or straight surface of the respective radial side surface.

It will be appreciated that the shorter such transition surface is (i.e. the smaller the distance is between the outer surface of the cable and the beginning of the concave part is), the more effective will the concave or straight surface be.

In one embodiment, the at least one strake is longer than the circumference of the cable, such as twice the length of the circumference. In one embodiment, the length of the at least one strake is equal to or longer than the length of the cable. It will be appreciated that if the strake forms a helical shape around the cable, its length will be longer than the length of the cable.

The strake may extend in a direction transverse to the longitudinal direction of the cable. In one embodiment, the at least one strake defines a helical line extending along the outer surface or the cable. The pitch of the spiral line may be in the range 20-70 degrees relative to the longitudinal direction of the cable, such as in the range 30-60 degrees, such as in the range 40-50 degrees. The spiral line may extend longitudinally along the entire length of the cable. Alternatively, or as a supplement, one or more strakes may extend along only a part of the cable.

Since cables may be exposed to wind from all directions, the at least one strake may be arranged relative to the cable such that the forces acting on the cable and the at least one strake are independent on a wind direction, thereby resulting in an omnidirectional solution, i.e. a cable with at least one strake having a performance being substantially independent of wind direction. If this is not fulfilled, the cable with at least one strake may appear asymmetric at certain wind directions which may introduce the risk for Den Hartog galloping vibrations. Once a cable moves/vibrates transversely to the oncoming wind, the instantaneous wind angle of attack changes periodically. Combined with the fact that the aerodynamic forces also depend on the angle of attack, some unlucky combinations can occur where energy is constantly feed into the vibration. Consequently, the vibration amplitudes can become very large and severe.

In one embodiment, the cross-sectional shape of the strake is asymmetric, while in other embodiments, the cross-sectional shape of the strake is symmetrical.

According to a second aspect, the invention provides a tension element for carrying at least a part of a structural element, the tension element comprising a cable and at least one a strake, the cable defining an outer surface onto which the at least one strake forms a protrusion for reducing rain and wind induced vibrations, wherein the strake has a height being a distance from a strake root part connected to the outer surface of the cable and a strake end part terminating the strake outwards away from the cable, the strake having a width being transverse to the height, the width decreasing in the direction from the strake root part towards the strake end part, wherein the height is less than 5 percent of the diameter of the cable, and wherein the strake comprises a first strake surface portion facing away from the cable, the first strake surface portion being concave or straight.

The tension element according to the second aspect of the invention may comprise any combination of features and/or elements of the invention according to the first aspect.

According to a third aspect, the present invention provides a method for reducing rain and wind induced vibrations in a cable which carries at least a part of the weight of a structural element in a construction, the method comprising the step of:

providing at least one strake having at least two surface portions, a first strake surface portion being concave or straight; and connecting the second strake surface portion to an outer surface of the cable so that the first strake surface portion is facing away from the cable.

It should be understood, that the method for reducing rain and wind induced vibrations may be used in connection with the construction according to the above-described first aspect of the invention may and in connection with the tension element according to the above-described second aspect of the invention. Thus, the features of the first and second aspects of the invention may be applicable in relation to the method for reducing rain and wind induced vibrations of the third aspect of the invention.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
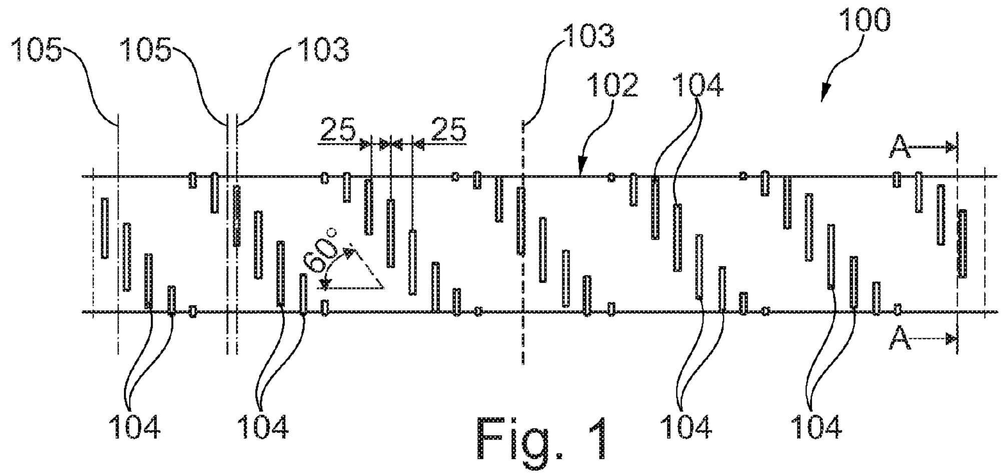
FIG. 1 discloses a cable according to a first embodiment of the invention.
Figure 2:
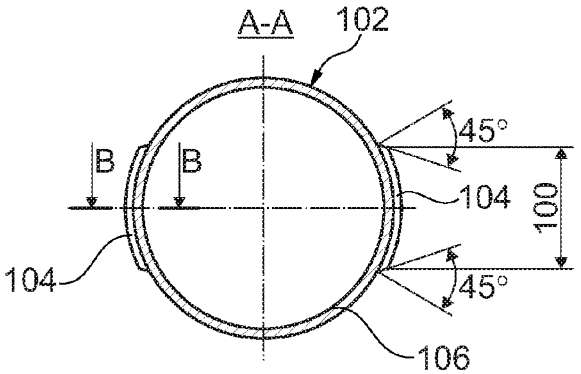
FIG. 2 discloses a cross-section of the cable of FIG. 1.
Figure 3:
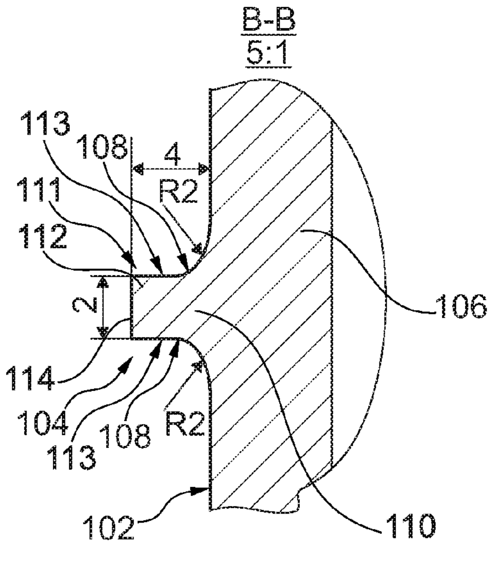
FIG. 3 discloses a cross-section of the of the strakes of the first embodiment, FIG. 4 discloses a cable according to a second embodiment of the invention, FIG. 5 discloses a cross-section of the cable of FIG. 4, FIG. 6 discloses a cross-section of the of the strakes of the second embodiment, FIG. 7 discloses a cross-section of a third embodiment, and FIG. 8 discloses a cross-section of a fourth embodiment.

FIG. 1 discloses a cable 100 defining an outer surface 102. In the embodiment of the figures a sheath (see. FIG. 2) is provided on the cable and this sheath defines the outer surface 102 of the cable. A plurality of strakes 104 is provided on the outer surface 102 of the cable. Each of the strakes extends in a direction transverse to the longitudinal direction of the cable 100. In FIG. 1 each of the strakes 104 extend in a direction orthogonal to the longitudinal direction of the cable. Moreover each of the strakes 104 may extend around only a part of the circumference of the cable such that each of the strakes covers only a $6^{th}$ of the circumference. Together the strakes form a helical pattern around the cable. It will be appreciated that in FIG. 1, the strakes 104 are provided in two helical patterns. The cable defines a first plurality of cross sections 103 (indicated by the dashed line) which extend though two strakes (one from each of the two helical patterns) and a second plurality of cross sections 105 (indicated by the dash-dotted lines) through which do not extend through any strake. Any two neighbouring strakes in the same helical pattern overlap and are spaced apart by a predetermined distance—in the figure any two neighbouring strakes are spaced apart by 25 millimeters. In the embodiment of FIGS. 1-3 the length of each of the strikes is 100 mm. Moreover as may be seen from the figures, the ends of each strake define an inclined angle of 45 degrees relative to a line which extends in the radial direction of the cable and extends through the tip of the strake. The provision of the inclined surface of the strakes causes the drag of the cable to be reduced.

Furthermore in the embodiment, FIGS. 1-3, the pitch angle of each of the helical patterns is 60 degrees relative to the longitudinal direction of the cable.

FIG. 2 discloses a cross section of the cable corresponding to the section A-A in FIG. 1. In the figure the sheath 106 is visible. Inside the sheath 106 the cable is provided. As it may be seen in the figure, each of the strakes 104 does not extend around the entire outer surface 102 of the sheath 106.

A cross section of one strake 104 (corresponding to section B-B in FIG. 2) is visible in FIG. 3. It will be appreciated from the figure, that concave surfaces 108 are defined on both sides of the strake 104. The concave surfaces face in opposite directions and located close to the strake root part 110, while a linear part 111 is located close to the strake end part 112. The linear part 111 defines linear side surfaces 113. Accordingly, each of the two radial side surfaces defines a concave surface 108 and a linear side surface 111. In the embodiment of FIG. 3, the end surface 114 is substantially flat. However in other embodiments, the end surface may be round or sharp.

Figure 4:
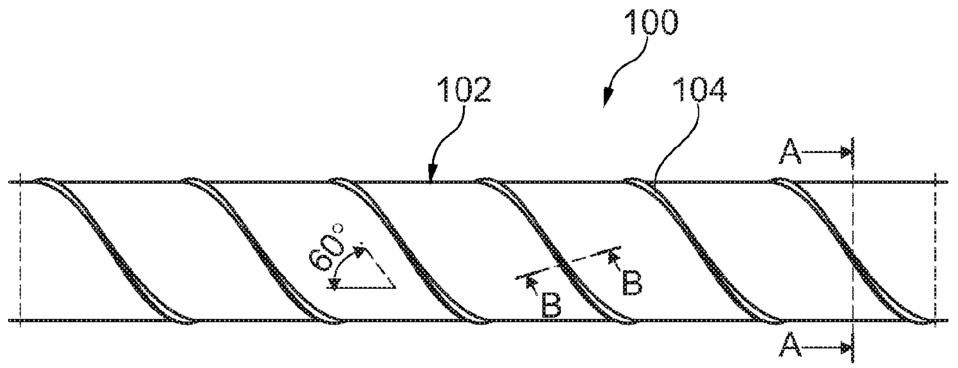
Figure 5:
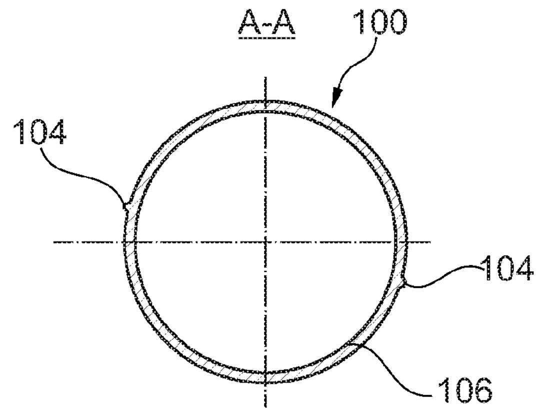
Figure 6:
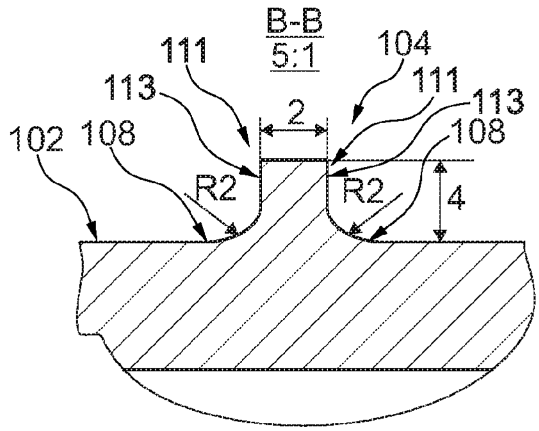

FIGS. 4-6 discloses second embodiment of cable in which two strakes 104 are provided in a helical pattern. Accordingly, one difference between the first embodiment of FIGS. 1-3 and the second embodiment of FIGS. 4-6 is that in the first embodiment a large plurality of strakes 104 are provided whereas only two strakes 104 are provided in the second embodiment. The two strakes of the second embodiment extend along the outer surfaces and they are thus longer than twice the circumference or the diameter of the cable 100.

It will be appreciated from FIG. 5 which discloses the cross section A-A of FIG. 1, that only two strakes 104 are provided on the sheath 106 of the cable. Although orientated differently FIGS. 6 and 2 discloses the same cross sectional shape of the strakes 104 and thus reference is made to the description of FIG. 3

Figure 7:
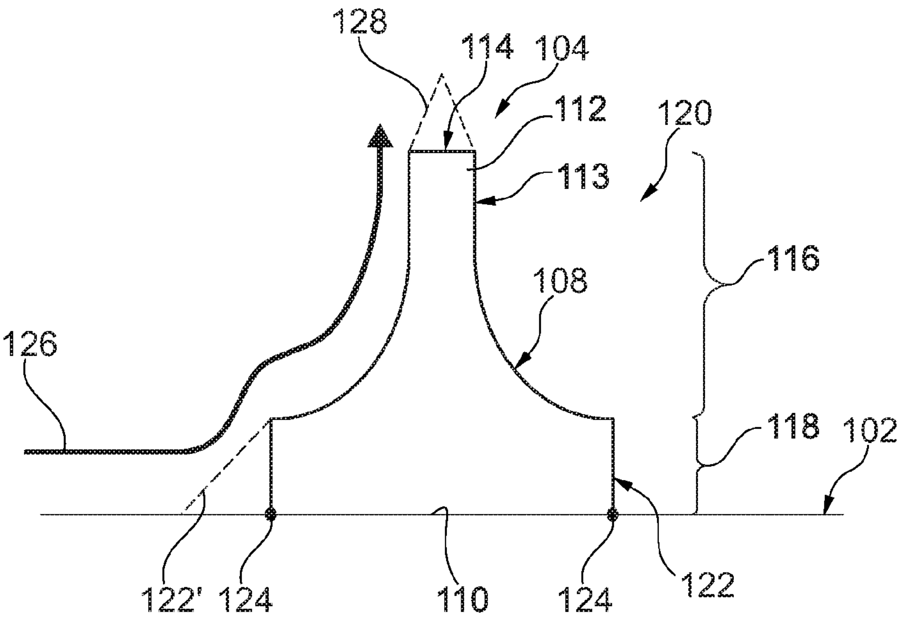
Figure 8:
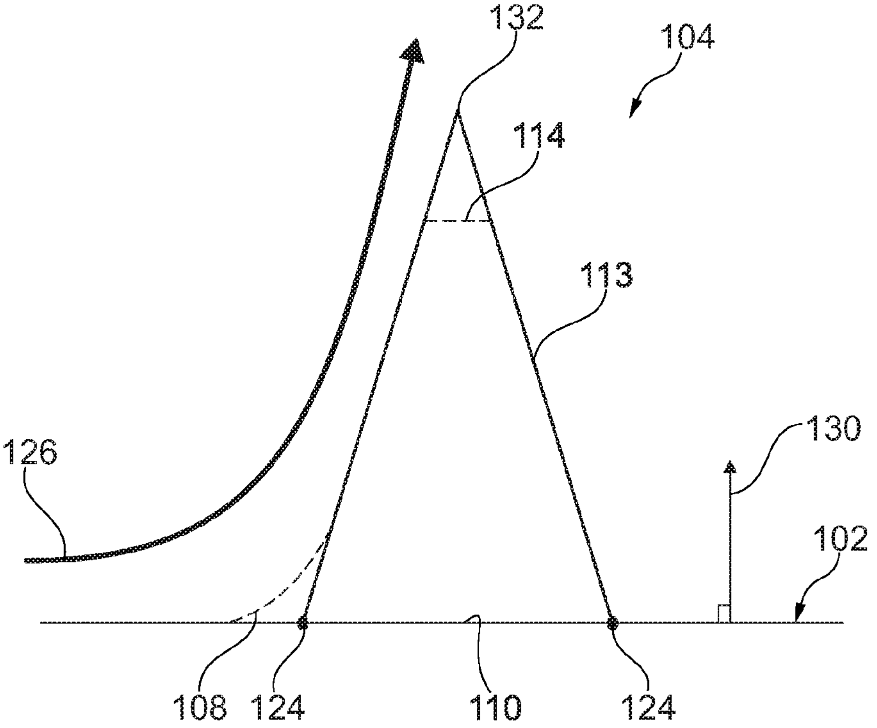

FIGS. 7 and 8 disclose two cross sections of the strake 104. In both cases the strakes 104 are illustrated as being fastened/formed on a straight surface, however it will be appreciated that most cables will have a round surface.

Initially the shape of the strake 104 in FIG. 7 is discusses disregarding the dotted lines (which disclose alternative shapes). The strake 104 comprises a concave part 116 and a transition part 118. The concave part is located closer to the strake end part 112 and the transition part 118 is located closes to the strake root part 110. The strake defines two radial side surface 120 each of which is defined by a linear side surface 113, a concave surface 108 and a transition surface 122 (which is linear in the figure). The strake extend from a contact point 124 defined on the outer surface 102. The strake end part 114 in the embodiment of FIG. 7 is flat.

When water flows along the outer surface 102—as indicated by arrow 126—it initially flows into contact with the transition surface 122 and further up along the concave surface 108 and subsequently onto the linear surface 113 and finally leaves the strake. Any water droplet contained on the outer surface flows along these surfaces and due to the concave surface it is forced away from the outer surface 102 of the strake. It will be appreciated that if the transition surface is inclined relative to the outer surface 102 (as indicated by the inclined transition surface 122') it will be guided onto the concave surface 108 instead of being halted by the transition surface 122 which extend in a direction orthogonal to the outer surface 102. Moreover, there is a risk that water droplets are collected on the flat end part 114, and thus the sharper it is the lower is the risk of such collection of water. In one embodiment the end part is sharp as indicated by dotted lines 128.

FIG. 8 discloses an alternative where the strake 104 has a triangular cross section. Accordingly, neither a transition part 118 nor a concave part 108 is defined. The linear side surface 113, extend in a direction transverse to the outer surface 102 and is non-parallel to a normal 130 defined on the outer surface 102 the cable. It will be appreciated that when the cable is circular this normal 130 extend in the radial direction of the cable.

A concave surface may be defined to guide the droplets on to the strake 104. It will be appreciated that such a concave surface 108 will function as a ramp.

In FIG. 8 the strake defines a tip 132 however in other embodiments a flat or concave end surface 114' may be defined as indicated by the dotted line 114'.

EMBODIMENTS

Embodiment 1

A cable or stay defining an outer surface onto which at least one strake is provided, wherein the strake defines a protrusion extending from a strake root part provided in the proximity of the outer surface of the cable or stay and towards a strake end part, and wherein the width of the strake decreases in the direction from the strake root part towards the strake end part.

Embodiment 2

A cable or stay according to embodiment 1, wherein a cross-sectional shape of the strake defines a triangle or a trapezoid.

Embodiment 3

A cable or stay according to embodiment 1 or 2, wherein the strake defines at least one concave surface.

Embodiment 4

A cable or stay according to any of the preceding embodiments, wherein the at least one concave surface is arranged to cause wind to deflect water from the outer surface of the cable or stay.

Embodiment 5

A cable or stay according to any of the preceding embodiments, wherein the concave surface in at least one point defines a tangent which coincides with a tangent of the outer surface of the cable or stay.

Embodiment 6

A cable or stay according to any of the preceding embodiments, wherein each strake comprises two concave surfaces arranged on opposite sides of the strake.

Embodiment 7

A cable or stay according to embodiment 6, wherein the two concave surfaces faces away from each other.

Embodiment 8

A cable or stay according to any of the preceding embodiments, wherein each strake is longer than the circumference of the cable or stay.

Embodiment 9

A cable or stay according to any of the preceding embodiments, wherein each strake defines a helical line extending along the outer surface or the cable or stay.

Embodiment 10

A cable or stay according any of the preceding embodiments, wherein the cable or stay is adapted to be used in supporting a bridge.

Embodiment 11

A cable or stay according to any of the preceding embodiments, wherein the cable or stay comprises at least one strand housed in a sheath which defines the outer surface of the cable or stay.

Embodiment 12

A cable or stay according to any of the preceding embodiments, wherein the cross-sectional shape of the strake is asymmetrical.

Embodiment 13

A cable or stay according to any of the preceding embodiments, wherein the outer surface or the cable or stay is substantially smooth.

Embodiment 14

A strake for use in a cable or stay according to any of the preceding embodiments.

Embodiment 15

A cable or stay defining an outer surface onto which at least one strake is provided, wherein the strake defines a protrusion extending from a strake root part provided in the proximity of the outer surface of the cable or stay and towards a strake end part, wherein the cross-sectional shape of the strake is substantially rectangular and wherein the radial extend of the strake is below 5 percent of the diameter of the cable.

The invention claimed is:

1. A construction comprising a structural element and at least one cable arranged in tension to carry at least a part of the weight of the structural element, the cable defining an outer surface onto which at least one strake forms a protrusion for reducing rain and wind induced vibrations, wherein the strake has a height being a distance from a strake root part connected to the outer surface of the cable and a strake end part terminating the strake outwards away from the cable, the strake having a width being transverse to the height, the width decreasing in the direction from the strake root part towards the strake end part, wherein the height is less than 5 percent of the diameter of the cable, and wherein the strake comprises a first strake surface portion facing away from the cable, the first strake surface portion being concave or straight, and wherein the first strake surface portion extends from the strake root part to the strake end part to provide a ramp for rivulets flowing longitudinally along the outer surface of the cable.

2. A construction according to claim 1, wherein the first strake surface portion extends from the strake root part to the strake end part.

3. A construction according to claim 1, wherein a cross-sectional shape of the strake defines a triangle or a trapezoid.

4. A construction according to claim 1, wherein the concave surface in at least one point defines a tangent which coincides with a tangent of the outer surface of the cable.

5. A construction according to claim 1, wherein the at least one strake comprises two concave surfaces.

6. A construction according to claim 5, wherein the two concave surfaces face away from each other.

7. A construction according to claim 1, wherein the at least one strake is longer than the circumference of the cable.

8. A construction according to claim 1, wherein the at least one strake defines a helical line extending along the outer surface of the cable.

9. A tension element for carrying at least a part of a structural element, the tension element comprising a cable and at least one strake, the cable defining an outer surface onto which the at least one strake forms a protrusion for reducing rain and wind induced vibrations, wherein the strake has a height being a distance from a strake root part connected to the outer surface of the cable and a strake end part terminating the strake outwards away from the cable, the strake having a width being transverse to the height, the width decreasing in the direction from the strake root part towards the strake end part, wherein the height is less than 5 percent of the diameter of the cable, and wherein the strake comprises a first strake surface portion facing away from the cable, the first strake surface portion being concave or straight, and wherein the first strake surface portion extends from the strake root part to the strake end part to provide a ramp for rivulets flowing longitudinally along the outer surface of the cable.

10. A method for reducing rain and wind induced vibrations in a cable which carries at least a part of the weight of a structural element in a construction, the method comprising the steps of:

providing at least one strake having at least two surface portions, a first strake surface portion being concave or straight;

arranging the first strake surface portion extending from a strake root part to a strake end part to provide a ramp for rivulets flowing longitudinally along an outer surface of the cable, and connecting the second strake surface portion to an outer surface of the cable so that the first strake surface portion is facing away from the cable, wherein a height of the at least one strake is less than 5 percent of the diameter of the cable.

* * * * *